US009349187B2

(12) United States Patent
Schepelmann et al.

(10) Patent No.: US 9,349,187 B2
(45) Date of Patent: *May 24, 2016

(54) VISUAL SEGMENTATION OF LAWN GRASS

(71) Applicants: MTD Products Inc, Valley City, OH (US); Case Western Reserve University, Cleveland, OH (US)

(72) Inventors: Alexander Schepelmann, Pittsburgh, PA (US); Kathryn A. Daltorio, Cleveland, OH (US); Amaury D. Rolin, Washington, DC (US); Jonathan Beno, Boulder, CO (US); Bradley E. Hughes, Butler, PA (US); James M. Green, Berea, OH (US); Michael S. Branicky, Shaker Heights, OH (US); Roger D. Quinn, Akron, OH (US); Henry H. Snow, Tannersville, NY (US); Francis L. Merat, University Heights, OH (US); Richard E. Hudson, Durham, NC (US)

(73) Assignees: MTD Products Inc, Valley City, OH (US); Case Western Reserve University, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/282,625

(22) Filed: May 20, 2014

(65) Prior Publication Data

US 2015/0071540 A1 Mar. 12, 2015

Related U.S. Application Data

(63) Continuation of application No. 13/380,413, filed as application No. PCT/US2010/001881 on Jul. 1, 2010, now Pat. No. 8,731,295.

(60) Provisional application No. 61/355,935, filed on Jun. 17, 2010, provisional application No. 61/339,868, filed on Mar. 10, 2010, provisional application No. 61/269,962, filed on Jul. 1, 2009.

(51) Int. Cl.
*G06K 9/34* (2006.01)
*G06T 7/00* (2006.01)
(Continued)

(52) U.S. Cl.
CPC .......... *G06T 7/0081* (2013.01); *A01D 34/008* (2013.01); *G06K 9/4619* (2013.01);
(Continued)

(58) Field of Classification Search
CPC .................. G06T 2207/20148; G06T 7/0081; G06T 7/0087; G06T 7/403; A01D 34/008; G06K 9/4619; G06K 9/4652; G06K 9/6292
USPC ................. 382/164, 168, 171, 173, 174, 274, 382/207.99, 466; 348/222.1, 207.99; 358/453, 466
See application file for complete search history.

(56) References Cited

U.S. PATENT DOCUMENTS 4,133,404 A * 1/1979 Griffin .......................... 180/169
5,134,661 A 7/1992 Reinsch
(Continued)

OTHER PUBLICATIONS

Batavia et al: "Obstacle detection using adpative color segmentation and color stereo homography", Proceedings 2001 ICRA. IEEE, vol. 1, pp. 705-710, ISBN: 0-7803-6576-3.
(Continued)

*Primary Examiner* — Ali Bayat
(74) *Attorney, Agent, or Firm* — Wegman, Hessler & Vanderburg

(57) ABSTRACT

Disclosed is a method for identifying lawn grass which includes capturing an image of the terrain in front of a mower, segmenting the image into neighborhoods, calculating at least two image statistics for each of the neighborhoods, generating a binary representation of each image statistic. The binary representation of each image statistic is generated by comparing the calculated image statistic values to predetermined image statistic values for grass. The method further includes weighting each of the binary representations of each image statistic, and summing corresponding neighborhoods for all image statistics. A binary threshold is applied to each of the summed neighborhoods to generate a binary map representing grass containing areas and non-grass containing areas.

10 Claims, 9 Drawing Sheets

(51) Int. Cl.
  A01D 34/00 (2006.01)
  G06K 9/46 (2006.01)
  G06K 9/62 (2006.01)
  G06T 7/40 (2006.01)
(52) U.S. Cl.
  CPC ............ *G06K9/4652* (2013.01); *G06K 9/6292* (2013.01); *G06T 7/0087* (2013.01); *G06T 7/403* (2013.01); *G06T 2207/20148* (2013.01)

(56) References Cited

U.S. PATENT DOCUMENTS

| | | | |
|---|---|---|---|
| 5,911,669 A * | 6/1999 | Stentz et al. | 56/10.2 F |
| 7,400,957 B2 | 7/2008 | Hofer et al. | |
| 8,731,295 B2 * | 5/2014 | Schepelmann et al. | 382/173 |
| 2008/0219508 A1 | 9/2008 | Ganguli et al. | |
| 2009/0319170 A1 | 12/2009 | Madsen et al. | |
| 2010/0053593 A1 | 3/2010 | Bedros et al. | |
| 2011/0157221 A1* | 6/2011 | Ptucha et al. | 345/629 |
| 2011/0157226 A1* | 6/2011 | Ptucha et al. | 345/638 |
| 2012/0158236 A1* | 6/2012 | Chung et al. | 701/25 |

OTHER PUBLICATIONS

Alon et al: "Off-road Path Following using Region Classification and Geometric Projection Constraints", CVPR, 2006, DOI: 10.1109/CVPR.2006.213, ISBN: 978-0-7695-2597-6.
Tuceryan: "Moment based texture segmentation", Pattern Recognition, 1992. vol. III., pp. 45-48, DOI: 10.1109/ICPR.1992.201924, ISBN: 978-0-8186-2920-04.
Communication pursuant to Article 94(3) EPC dated Jun. 11, 2014 for corresponding European Patent Application No. 10 736 866.4.
International Search Report and Written Opinion mailed Sep. 24, 2010 for PCT/US2010/001881 filed Jul. 1, 2010.
International Preliminary Report on Patentability mailed Jan. 4, 2012 for PCT/US2010/001881 filed Jul. 1, 2010.
Smith, "Color Gamut Transform Pairs", Computer Graphics Lab, New York Institute of Technology, Old Westbury, NY, pp. 12-19, 1978.
Marr et al., "Theory of Edge Detection", Proceedings of the Royal Society of London, Series B, vol. 207, No. 1167, pp. 187-217, Feb. 29, 1980.
Chateau et al., "An Original Correlation and Data Fusion Based Approach to Detect a Reap Limit into a Gray Level Image", IEEE, pp. 1258-1263, 1997.
Bertozzi et al., "GOLD: A Parallel Real-Time Stereo Vision System for Generic Obstacle and Lane Detection", IEEE Transactions on Image Processing, vol. 7, No. 1, pp. 62-80, Jan. 1998.
Hicks, II, et al., "A Survey of Robot Lawn Mowers", 8 pages, 2000.
Ulrich et al., "Appearance-Based Obstacle Detection with Monocular Color Vision", Proceedings of the AAAI National Conference on Artificial Intelligence, Austin, Texas, Jul./Aug. 2000, 6 pages.
Bellutta et al., "Terrain Perception for DEMO III", Proceedings of the 2000 Intelligent Vehicles Conference, Dearborn, Michigan, Oct. 4-5, 2000, 6 pages.
Hemming et al., "Computer-Vision-Based Weed Identification Under Field Conditions Using Controlled Lighting", J. Agric. Engng. Res. vol. 78, No. 3, pp. 233-243, 2001.
Batavia et al., "Obstacle Detection Using Adaptive Color Segmentation and Color Stereo Homography", 6 pages, 2001.
Desouza et al., "Vision for Mobile Robot Navigation: A Survey", IEEE Transactions on Pattern Analysis and Machine Intelligence, vol. 24, No. 2, pp. 237-267, Feb. 2002.
Philipp et al., "Improving Plant Discrimination in Image Processing by Use of Different Colour Space Transformations", Computers and Electronics in Agriculture, vol. 35, pp. 1-15, 2002.
Salvador et al., "Spatio-Temporal Shadow Segmentation and Tracking", Signal Processing Institute (ITS), Swiss Federal Institute of Technology (EPFL) Lausanne, Switzerland, 12 pages, 2003.
Karcher et al., "Quantifying Turfgrass Color Using Digital Image Analysis", Turfgrass Science, Crop Sci., vol. 43, pp. 943-951, 2003.
Karklin et al., "Learning Higher-Order Structures in Natural Images", Institute of Physics Publishing, Network: Computation in Neural Systems, vol. 14, pp. 483-499, 2003.
Dima et al., "Classifier Fusion for Outdoor Obstacle Detection", Carnegie Mellon University, The Robotics Institute, Apr. 26, 2004, 7 pages.
Taylor et al., "Molecular Vision as a Range Sensor", CIMCA 2004 Proceedings pp. 566-575, Jul. 12-14, 2004, Gold Coast, Australia.
Montemerlo et al., "Winning the DARPA Grand Challenge with an AI Robot", pp. 982-987, 2006.
Sheh et al., "A Low-Cost, Compact, Lightweight 3D Range Sensor", 8 pages, 2006.
Watchareeruetai et al., "Computer Vision Based Methods for Detecting Weeds in Lawns", Machine Vision and Applications, vol. 17, pp. 287-296, 2006.
Aziz et al., "Evaluation of Visual Attention Models for Robots", Proceedings of the Fourth IEEE International Conference on Computer Vision Systems (ICVS 2006), 6 pages, 2006.
Kim et al., "Traversability Classification for UGV Navigation: A Comparison of Patch and Superpixel Representations", Oct. 29, 2007.
Ali, "Tree Detection Using Color, and Texture Cues for Autonomous Navigation in Forest Environment", Master's Thesis in Computing Science, Umea University, Department of Computing Science Sweden, Jun. 2006.
Zafarifar et al., "Grass Field Detection for TV Picture Quality Enhancement", 2 pages, Aug. 5, 2008.
McMichael, "Lane Detection for DEXTER, and Autonomous Robot, in the Urban Challenge", Master's Thesis, Submitted for the Degree of Master of Science, Case Western Reserve University, May 2008.
Beno et al., "2008 Cutter Technical Report", Case Western Reserve University, 30 pages, May 7, 2008.
Beno et al., CWRU Cutter 2.0 Technical Report, Case Western Reserve University, 31 pages, May 14, 2009.
"The Sixth! Annual Robotic Lawnmower Competition Rulebook", Revision Jan. 2, 2009, May 28-31, 2009, Dayton, Ohio, 21 pages.
Bohren et al., "Little Ben: The Ben Franklin Racing Team's Entry in the 2007 DARPA Urban Challenge", M. Bueher et al., (Eds.): The DARPA Urban Challenge, STAR 56, pp. 231-255, 2009.
Schepelmann et al., "Vision-Based Obstacle Detection and Avoidance for the CWRU Cutter Autonomous Lawnmower", 6 pages, Nov. 9, 2009.
Wang, "Autonomous Machine Vision for Off-Road Vehicles in Unstructured Fields," Urbana, Illinois, Dissertation, Submitted for the Degree of Doctor of Philosophy in Agricultural and Biological Engineering, University of Illinois at Urbana-Champaign, 2009.
Hughes et al., "C3-CWRU Cutter C, Technical Report", Case Western Reserve University, 7th Autonomous Lawnmower Competition Group, 31 pages, May 14, 2010.
Wybo et al., "Obstacles Avoidance by Monocular Multi-Cue Image Analysis", 12 pages, Nov. 15, 2008, 15th World Congress on ITS.
Daltorio et al., "An Obstacle-Edging Reflex for an Autonomous Lawnmower", Case Western Reserve University, 14 pages, May 2010.
Dima et al., "Sensor and Classifier Fusion for Outdoor Obstacle Detection: an Application of Data Fusion to Autonomous Off-Road Navigation" Proceedings of the 32nd Applied Imagery Pattern Recognition Workshop (2003).
Communication from European Patent Office, dated Nov. 13, 2012, for corresponding European Patent Application No. 10736866.4.
Bacha et al., "Odin: Team VictorTango's Entry in the DARPA Urban Challenge" "Special Issue on the 2007 DARPA Urban Challenge, Part 1" Journal of Field Robotics, 25:467-492 (Jan. 2008).
Miller et al., "Team Cornell's Skynet: Robust Perception and Planning in an Urban Environment" "Special Issue on the 2007 DARPA Urban Challenge, Part 1" Journal of Field Robotics, 25:493-527 (Jan. 2008).
Patz et al., "A Practical Approach to Robotic Design for the DARPA Urban Challenge" "Special Issue on the 2007 DARPA Urban Challenge, Part 1" Journal of Field Robotics, 25:528-566 (Jan. 2008).

(56) References Cited

OTHER PUBLICATIONS

Forsyth, D.A. and Ponce, J., "Computer Vision: A Modern Approach" Prentice Hall (Jan. 2003).

Gonzalez, R.C. and Woods, R.E., "Digital Image Processing" Third Edition, Prentice Hall (Jan. 2008).

Borenstein et al., "The Vector Field Histogram-Fast Obstacle Avoidance for Mobile Robots" IEEE Journal of Robots and Automation, 7:278-288 (Jun. 1991).

Broggi et al., "The Single Frame Stereo Vision System for Reliable Obstacle Detection Used During the 2005 DARPA Grand Challenge on TerraMax" Proceedings of the IEEE ITSC 2006 IEEE Intelligent Transportation Systems Conference, 745-752 (Sep. 2006).

Camhi et al., "High-Frequency Steering Maneuvers Mediated by Tactile Cues: Antennal Wall—Following in the Cockroach" J. Exp. Bio., 202:631-643 (Feb. 1999).

Chen et al., "A Crash Avoidance System Based Upon the Cockroach Escape Response Circuit" Proceedings of the 1997 IEEE International Conference on Robotics and Automation, 2007-2012 (Apr. 1997).

Frazzoli, "Real-Time Motion Planning for Agile Autonomous Vehicles" J. Guidance, Control, and Dynamics, 25:116-129 (Jan. 2002).

Kalman, "A New Approach to Linear Filtering and Prediction Problems" Transactions of the ASME—Journal of Basic Engineering 82(Series D):35-45 (Jan. 1960).

Kelly, "An Intelligent Predictive Control Approach to the High-Speed Cross-Country Autonomous Navigation Problem" PHD Thesis, Carnegie Mellon (Sep. 1995).

Lumelski et al., "Dynamic Path Planning for a Automaton with Limited Information on the Environment" IEEE Transactions on Automatic Control, AC-31:1058-1063 (Nov. 1986).

Maxwell, "On the Theory of Compound Colours, and the Relations of the Colours of the Spectrum" Phil. Trans. R. Soc., 150:57-84 (Mar. 1860).

Minguez et al., "Abstracting Vehicle Shape and Kinematic Constraints from Obstacle Avoidance Methods" Autonomous Robots, 20:43-59 (Feb. 2006).

Newman, "Team CASE and the 2007 DARPA Urban Challenge" DARPA Grand Challenge Tech Report, http/www.darpa.mil/Jun. 2007.

Newman, "Roberto" IGVC Design Report retrieved from http:/igvc.org/design/reports/dr148.pdf (Jan. 2006).

Nourani-Vatani et al., "Practical Path Planning and Obstacle Avoidance for Autonomous Mowing" Australasian Conference on Robotics and Automation (Jan. 2006).

Schepelmann et al., "Visual Segmentation of Lawn Grass for a Mobile Robotic Lawnmower" IEEE/RSJ International Conference on Intelligent Robots and Systems, 18-22 (Submitted) (Mar. 2010).

Smith et al., "Design and Implementation of a Control Algorithm for an Autonomous Lawnmower" Midwest Symposium on Circuits and Systems (Jan. 2005).

Thrun et al., "Stanley: The Robot that Won the DARPA Grand Challenge" Journal of Field Robotics, 23:661-692 (Jun. 2006).

Wikman et al., "Reflexive Collision Avoidance: A Generalized Approach" IEEE ICRA, pp. 31-36 (Jan. 1993).

Yata et al., "Wall Following Using Angle Information Measured by a Single Ultrasonic Transducer" Proceedings of the IEEE International Conference on Robotics & Automation, pp. 1590-1596 (May 1998).

Ritzmann, R.E. "The Neural Organization of Cockroach Escape and Its Role in Context Dependent Orientation", Chapter VI in "Biological Neural Networks in Invertebrate Neuroethology and Robotics" Ed: Beer et al., Academic Press, pp. 113-137 (Jan. 1993).

Chen, G., "Texture Based Road Surface Detection" M.S. Thesis, Case Western Reserve University (Aug. 2008).

Bemporad et al., "Sonar-Based Wall-Following Control of Mobile Robots" submitted to Journal of Dynamic, Measurement and Control (Jan. 1997).

Garcia-Alegre et al., "Autonomous Robot in Agricultural Tasks" European Conference on Precision Agriculture, France (Jan. 2001).

Kanayama et al., "A New Line Tracking Method for Nonholonomic Vehicles" Proceedings of the IEEE International Conference on Robots and Automation, New Mexico (Apr. 1997).

Oh et al., "Complete Coverage Navigation of Cleaning Robots Using Triangular-Cell-Based Map" IEEE Transactions on Industrial Electronics, 51:718-726 (Jun. 2004).

Prassler et al., "A Short History of Cleaning Robots" Autonomous Robots, 9:211-226 (Jan. 2000).

Schafer et al., "3D Obstacle Detection and Avoidance in Vegetated Off-Road Terrain" IEEE International Conference on Robotics and Automation, California, pp. 923-928 (May 2008).

Tsugawa, S., "A History of Automated High Systems in Japan and Future Issues" Proceedings of the 2008 IEEE International Conference on Vehicular Electronics and Safety, Ohio (Sep. 2008).

Ulrich et al., "Autonomous Vacuum Cleaner" Robotics and Autonomous Systems, 19:233-245 (Jan. 1997).

Yokoi et al., "Development of a Whisker Sensor System and Simulation of Active Whisking for Agent Navigation" Proceedings of 2004 IEEE/RSJ International Conference on Intelligent Robots and Systems, Japan (Sep. 2004).

Kyodo America, "LB3510 Manual", http:/www.lawnbott.com/pdf/LB3510-manual.pdf (Jan. 2009).

Robomower Review, http://bamabots.com/rl1000review.htm (Nov. 2005).

Kyodo America, "How LawnBott Works", http://lawnbott.com/buyers/how-it-works/ (Jan. 2012).

Mahalanobis, P.C., "On the Generalized Distance in Statistics" Proceedings of the National Institute of Sciences in India (Apr. 1936).

Grewal et al., "Global Positioning Systems, Inertial Navigation, and Integration" Hoboken, NJ: Wiley, p. 394 (Jan. 2008).

Liu et al., "Hue Image RGB Colour Composition. a Simple technique to suppress shadow and enhance special signature" International Journal of Remote Sensing, 11:1521-1530 (Jan. 1990).

Carelli et al., "Corridor navigation and wall-following stable control for sonar-based mobile robots" Robotics and Autonomous Systems, 45:235-247 (Jan. 2003).

Lamperski et al., "Dynamical Wall Following for a Wheeled Robot Using a Passive Tactile Sensor" Proceedings of the IEEE International Conference on Robotics and Automation, Barcelona, Spain, pp. 3838-3843 (Apr. 2005).

Brooks, R., "A robust layered control system for a mobile robot" IEEE J. Robotics Autom., vol. RA-2:14-23 (Mar. 1986).

Noborio et al., "Sensor-based path-planning algorithms for a nonholonomic mobile robot" International Conference on Intelligent Robots and Systems, pp. 917-924 (Jan. 2000).

Kanayama et al., "A locomotion control method for autonomous vehicles" Proceedings of the IEEE International Conference on Robotics and Automation, Philadelphia, PA, pp. 1315-1317 (Jan. 1988).

Lavalle et al., "Rapidly-exploring random trees: Progress and Prospects" Algorithmic and Computational Robotics, Eds. Donald, Lynch, and Russ; AK Peters Wellesley, MA, pp. 1-17 (Jan. 2001).

Kavraki et al., "Probablistic roadmaps for path planning in high-dimensional configuration spaces" IEEE Trans. Robot. & Auton., 12:566-580 (Aug. 1996).

Simmons, R., "The Curvature-Velocity Method for Local Obstacle Avoidance" International Conference on Robotics and Automation, pp. 3375-3382 (Apr. 1996).

Jung et al., "Whisker-based mobile robot navigation" Proceedings of the IEEE/RSJ International Conference on Intelligence Robots and Systems (IROS), 2:497-504 (Jan. 1996).

Sekhavat et al., "Multilevel path planning for nonholonomic robots using semiholonomic subsystems" Int. J. Robot. Res., 17:840-857 (Jan. 1998).

Khatib et al., "Real-Time Obstacle Avoidance for Manipulators and Mobile Robots" In Proceedings of the IEEE International Conference on Robotics and Automation, St. Louis, MO, pp. 500-505 (Jan. 1985).

(56) References Cited

OTHER PUBLICATIONS

Stachniss et al., "An Integrated Approach to Goal-Directed Obstacle Avoidance under Dynamic Constraints for Dynamic Environments" IROS (Oct. 2002).

Chatterjee et al., "Use of single side reflex for autonomous navigation of mobile robots in unknown environments" Robotics and Autonomous Systems, 35:77-96 (Jan. 2001).

Buehler et al., "Editorial" "Special Issue on the 2007 DARPA Urban Challenge, Part 1" Journal of Field Robotics, 25:423-424 (Jan. 2008).

Urmson et al., "Autonomous Driving in Urban Environments: Boss and the Urban Challenge" "Special Issue on the 2007 DARPA Urban Challenge, Part 1" Journal of Field Robotics, 25:425-466 (Jan. 2008).

\* cited by examiner

FIG. 5a

| 1/6 | 1/6 | 1/6 |
|---|---|---|
| 1/6 | 0 | 0 |
| 1/6 | 0 | 0 |

Neighborhood Statistic
*a*
1/6 Weight

| 0 | 1/6 | 1/6 |
|---|---|---|
| 0 | 0 | 1/6 |
| 0 | 0 | 0 |

Neighborhood Statistic
*b*
1/6 Weight

| 1/6 | 1/6 | 1/6 |
|---|---|---|
| 0 | 0 | 1/6 |
| 0 | 0 | 1/6 |

Neighborhood Statistic
*c*
1/6 Weight

| 0 | 1/6 | 1/6 |
|---|---|---|
| 0 | 0 | 1/6 |
| 0 | 0 | 1/6 |

Neighborhood Statistic
*d*
1/6 Weight

| 1/3 | 1/3 | 1/3 |
|---|---|---|
| 0 | 0 | 1/3 |
| 0 | 0 | 1/3 |

Neighborhood Statistic
*e*
1/3 Weight

FIG. 5b

VISUAL SEGMENTATION OF LAWN GRASS

CROSS REFERENCE TO RELATED APPLICATION

This application is a continuation of U.S. patent application Ser. No. 13/380,413, filed Apr. 10, 2012, which is a U.S. National Phase Application based on International Application No. PCT/US2010/001881, filed Jul. 1, 2010, which claims the priority benefit of U.S. Provisional Patent Application Ser. No. 61/269,962, filed Jul. 1, 2009; U.S. Provisional Patent Application Ser. No. 61/339,868, filed Mar. 10, 2010; and U.S. Provisional Patent Application Ser. No. 61/355,935, filed Jun. 17, 2010, all of which are incorporated by reference in their entireties.

FIELD OF THE INVENTION

This invention relates generally to a method of identifying lawn grass. In particular, it relates to a method of identifying lawn grass for use with an autonomous lawnmower.

BACKGROUND OF THE INVENTION

Autonomous robots are increasingly becoming part of our daily lives. Autonomous lawnmowers have recently gained popularity, yet, currently available consumer versions do not possess the ability to sense obstacles from a distance. It is known that LIDAR can sense obstacles from a distance; however, it is cost prohibitive to place a LIDAR unit on a consumer lawnmower. Accordingly, there is a need to develop a cost-effective obstacle detection method for an autonomous lawnmower.

SUMMARY OF THE INVENTION

A method for identifying lawn grass comprising capturing an image of the terrain in front of a mower, segmenting the image into neighborhoods, calculating at least two image statistics for each of the neighborhoods, and generating a binary representation of each image statistic. The binary representation of each image statistic is generated by comparing the calculated image statistics to predetermined image statistics for grass. The method further comprises weighting each of the binary representations of each image statistic and summing corresponding neighborhoods for all image statistics. A binary threshold is applied to each of the summed neighborhoods to generate a binary map representing grass containing areas and non-grass containing areas.

BRIEF DESCRIPTION OF THE DRAWINGS

These and other aspects of the invention will be understood from the description and claims herein, taken together with the drawings showing details of construction and illustrative embodiments, wherein:

FIGS. 5a-b illustrate the multiplication of resulting binary images for the neighborhood statistics created in block 375 by their normalized coefficients in accordance with an embodiment of the present invention.

DETAILED DESCRIPTION OF THE INVENTION

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

One embodiment of an obstacle detection method that can be used for vision processing in an autonomous lawnmower is to identify driveable terrain around the lawnmower through the identification of grass in images segmented into regions, or "neighborhoods". Observed image regions that do not match the measured grass statistics are marked as "obstacle containing regions" and observed image regions that do match the measured grass statistics are marked as "grass containing regions." This creates a binary freespace map around the robot for every camera frame, which is abstracted into range images.

Figure 1:
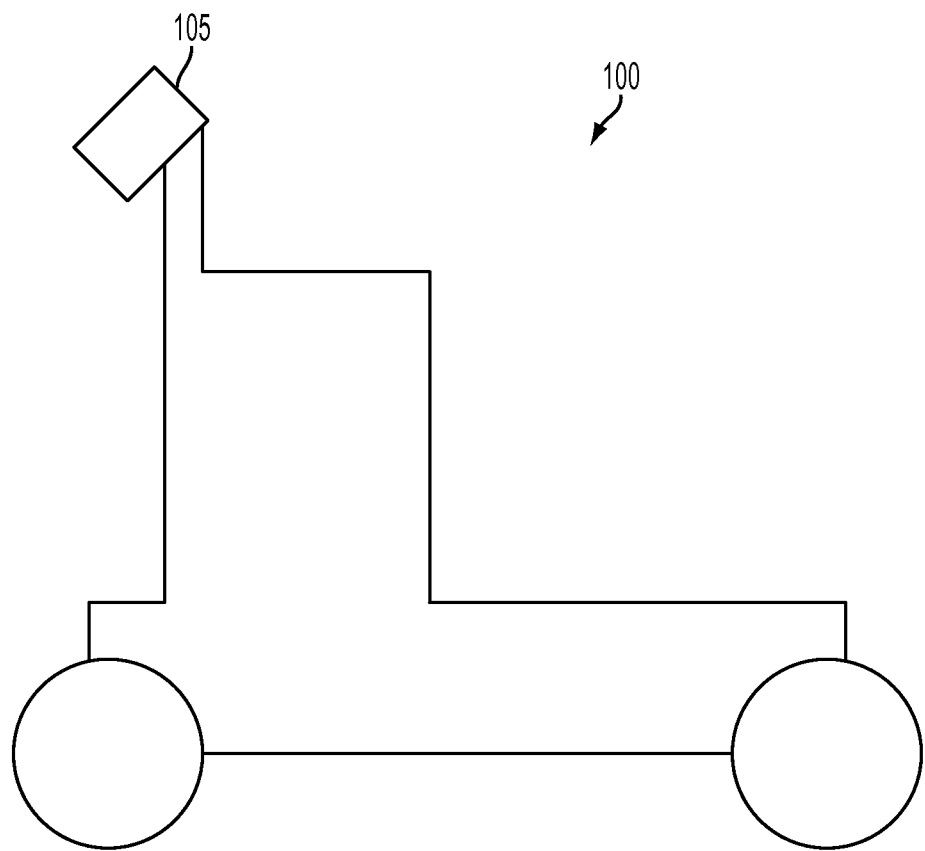
FIG. 1 illustrates a side view of an autonomous robotic mower in accordance with an embodiment of the present invention.
Figure 2:
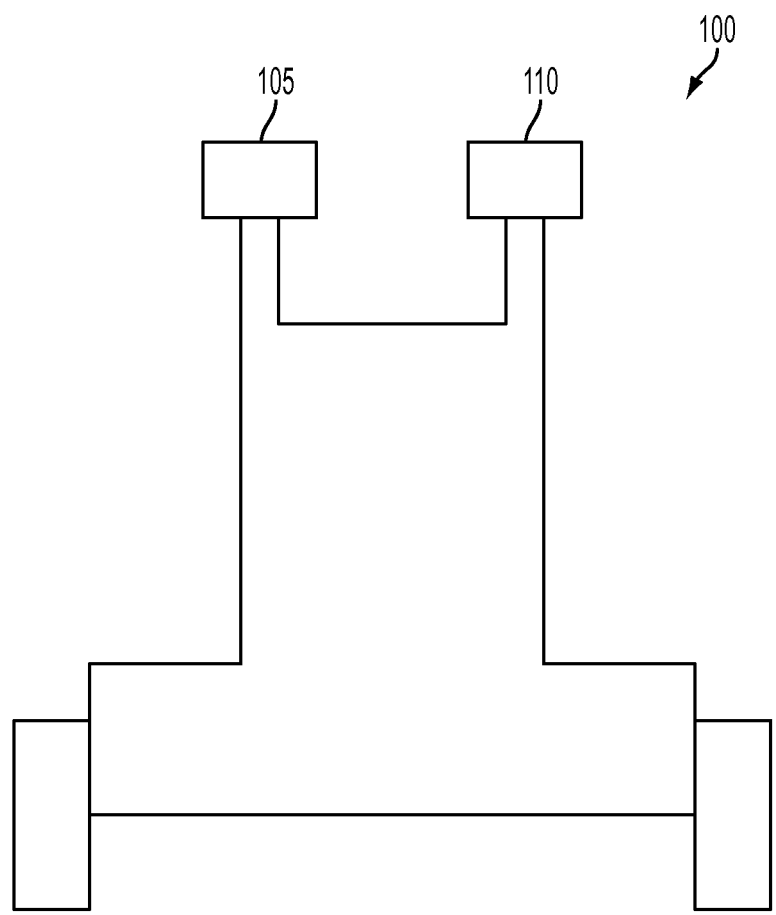
FIG. 2 illustrates a front view of an autonomous robotic mower in accordance with an embodiment of the present invention.
Figure 3A:
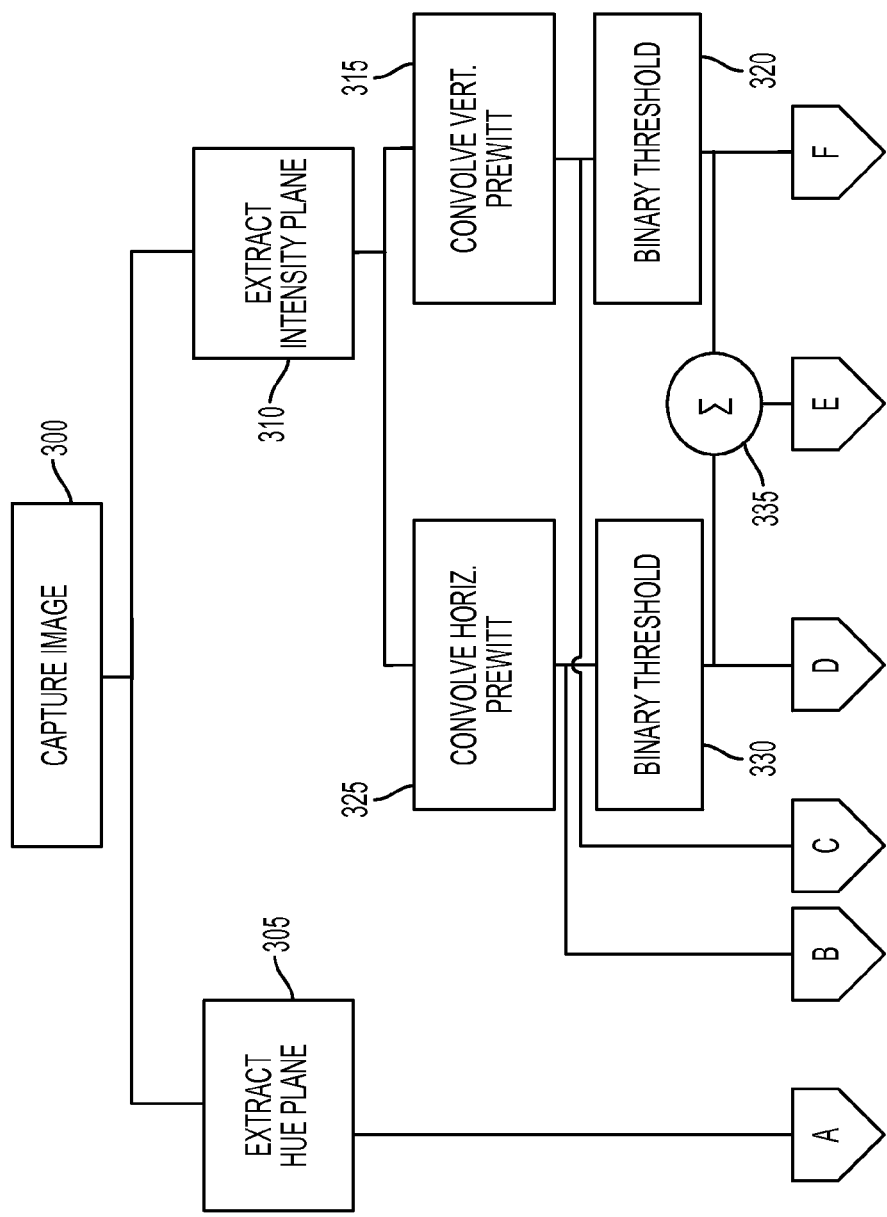
FIGS. 3a-b contain a flow chart in accordance with an embodiment of the present invention.
Figure 3B:
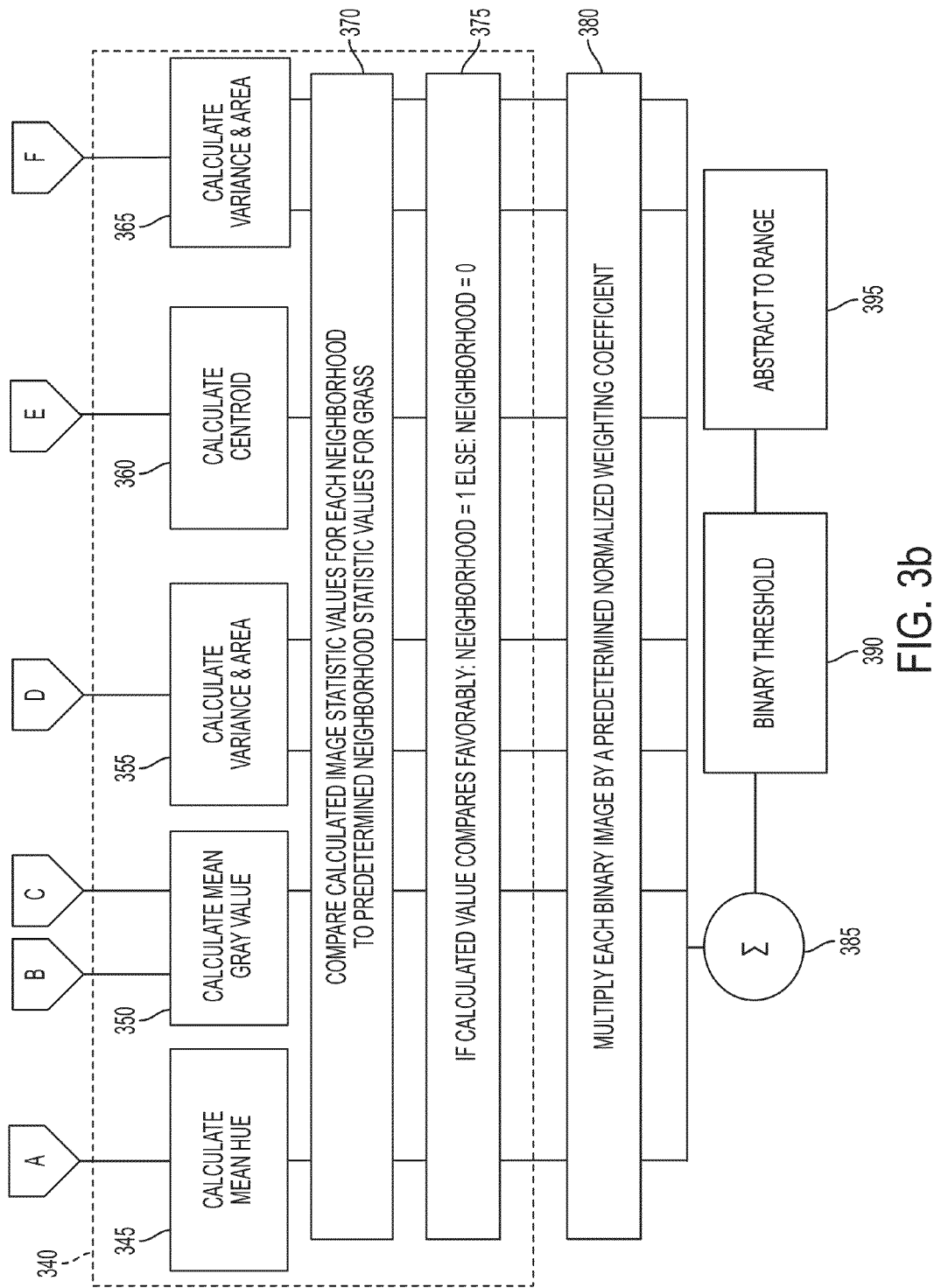

Turning now to an embodiment of the invention as shown in FIGS. 3a-b, in block 300, image data is captured of the terrain in front of the lawnmower. In the preferred embodiment, the data is acquired using a camera mounted on the top of the lawnmower elevated 0.75 meters at an angle of −45° to the horizontal. In test runs of the preferred embodiment, logged images included the following objects and conditions: 640×480 resolution images of fully illuminated grass, as well as 50×50 image regions taken at 640×480 resolution of each of the following obstacle surfaces: shaded grass, flowerbed edging, flowers, blue jeans, and a soccer ball. Statistical measurements were collected for a mixture of both illuminated and shaded obstacles to simulate common conditions an autonomous lawnmower may encounter. In one embodiment, the camera is an ImagingSource DFK21AF04 FireWire camera with a Kowa LM4PBR 4.0 mm F1.2 CS-Mount lens. The camera captures 640×480 resolution images at 30 frames/sec and is connected via firewire to a 1.83 GHz Mac Mini running Windows XP with 4 GB of memory. It is contemplated that a person having ordinary skill in the art can choose to use a different camera and/or hardware to process the images captured by the camera. FIGS. 1-2 show different views of an autonomous lawnmower 100 having camera 105 and an optional second camera 110. It is contemplated that some embodiments can have more than one camera.

In block 305, the hue component of the HSL color vector is calculated and extracted from the RGB image captured in block 300. Unlike RGB color values, hue values at corresponding saturation values have been found to be insensitive to shadows and changing lighting conditions. Since the raw camera image captured in block 300 are represented in the RGB color space, it is first necessary to calculate the hue component of the HSL color vector according to:

$$h = \cos^{-1}\left(\frac{0.5\ r-g+r-b}{r-g^2+r-b\ g-b^{0.5}}\right) h \in 0, \pi \text{ for } b \leq g$$

$$h = 2\pi - \cos^{-1}\left(\frac{0.5\ r-g+r-b}{r-g^2+r-b\ g-b^{0.5}}\right) h \in \pi, 2\pi \text{ for } b > g$$

where h is the normalized hue component and r, g, and b are the normalized components of the original RGB vector. The normalized RGB components are given by:

$$r = \frac{R}{R+G+B}$$

$$g = \frac{G}{R+G+B}$$

$$b = \frac{B}{R+G+B}.$$

Since HSL color space can be represented by a cone where all possible hue values lie on the cone's plane base, hue values can be represented by an integer in the range [0, 360]. These values are represented as integers due to the way colors are represented in digital images. Since h is the normalized hue component, it is necessary to scale the normalized hue component h into the [0, 360] range through the equation:

$$H = (\text{int})\left(\frac{180h}{\pi}\right)$$

where (int) represents a typecasting operation of the scaled value into an integer and H is the scaled hue component of the HSL color vector. It is important to note that singularities occur when r, g, and b lie along the RGB color cube's grayline and therefore have the same numerical value. This results from color representation in the HSL color model where white, black, and grays have an undefined hue.

In block 310, the intensity plane is extracted from the image captured in block 310 by converting each pixel of the RGB image captured by the camera in block 300 into an unblurred grayscale image by extracting the intensity component I, of the HSL color model where I is given by the mean value of the RGB components for individual pixels, or:

$$I = \frac{R+G+B}{3}.$$

In block 315, the vertical edge response is extracted from the unblurred grayscale image created in block 310 by convolving the image within a vertical (Gy) Prewitt convolution kernel, respectively given by:

$$Gy = \begin{bmatrix} -1 & -1 & -1 \\ 0 & 0 & 0 \\ +1 & +1 & +1 \end{bmatrix}.$$

In block 325, the horizontal edge response is extracted from the unblurred grayscale image created in block 310 by convolving the image with a horizontal (Gx) Prewitt convolution kernel, respectively given by:

$$Gx = \begin{bmatrix} -1 & 0 & +1 \\ -1 & 0 & +1 \\ -1 & 0 & +1 \end{bmatrix}.$$

In both blocks 315 and 325, the convolution operation computes the edge strength based on grayscale intensity values of a pixel and its eight adjacent neighbors and plots the magnitude of the edge strength in the center pixel. The 2D spatial convolution operation is given by:

$$E(x, y) = \sum_{j=0}^{J-1}\sum_{k=0}^{K-1} G(j,k)I(x-j, y-k)$$

where E(x,y) is the computed edge strength of a pixel located in the center of a 3×3 neighborhood located at (x,y) in the image, j→J−1 and k→K−1 are the indices of the convolution kernel G, and I(a,b) is the intensity value of a pixel located at the input coordinate pair (a,b). Convolving the image with Gx and Gy generates two new images that indicate edge response for the given filter, wherein the pixel intensity given by an integer value indicates the edge strength at that pixel location. We refer to the resulting images as "horizontal-" and "vertical texture images," respectively. In one embodiment, the integer value is between [0, 255], but it is contemplated that a person having ordinary skill in the art can choose to use other ranges. In this application, we define "visual texture" as a collection of edges within an image region or "neighborhood."

In block 320, using the grayscale image produced in block 315, a vertical binary texture image is created by discarding edge strengths below an empirical threshold and setting corresponding pixel locations of edge strength above the threshold in a binary image equal to 1. Pixel groupings with an area of 1 in the binary image are removed. In one embodiment, the empirically determined threshold is 21, but it is contemplated that a person having ordinary skill in the art can choose to use a different threshold value. Unconnected pixels in the vertical binary texture image are also removed.

In block 330, using the grayscale image produced in block 325, a horizontal binary texture image is created by discarding edge strengths below an empirical threshold and setting corresponding pixel locations of edge strength above the threshold in a binary image equal to 1. Pixel groupings with an area of 1 in the binary image are removed. In one embodiment, the empirically determined threshold is 21, but it is contemplated that a person having ordinary skill in the art can choose to use a different threshold value. Unconnected pixels in the horizontal binary texture image are also removed.

In block 335, the corresponding horizontal and binary vertical texture images created in blocks 320 and 330 are combined to yield a directionally ambiguous binary texture image corresponding to a grayscale version of the image captured in block 300.

In block 340, the images produced in blocks 305, 315, 320, 325, 330, and 335 are each divided up into neighborhoods. In one embodiment, these neighborhoods range from 11×11 to 41×41 pixels in increments of 10 pixels, however it is contemplated that a person having ordinary skill in the art can choose to use a larger or smaller neighborhood. The operations that take place in block 340 are detailed below in blocks 345-375, in which the image statistics are calculated for each neighborhood of the image captured in step 300. The image statistics include the mean hue (block 345) and the following edge based texture statistics: the mean grayscale horizontal intensity value (block 350), mean grayscale vertical intensity value (block 350), vertical binary variance (block 355), mean vertical binary edge response area (block 355), horizontal and vertical neighborhood centroid location in directionally invariant binary texture image (block 360), horizontal binary variance (block 365), and mean horizontal binary edge response area (block 365).

Although this embodiment is discussed with reference to the neighborhood statistics listed in the paragraph above, it is understood that a person having ordinary skill in the art can choose to use more, less, or other image statistics.

In blocks 345, the mean hue of each neighborhood is calculated using the image produced in block 305. The mean hue value is calculated individually for each neighborhood by summing up all the mean hue pixel values for each neighborhood in the image generated in block 305, and dividing by the total number of pixels within the neighborhood. This is done for each neighborhood in the image. Accordingly, a mean hue image statistic value is calculated for each neighborhood in the image.

In block 350, the mean grayscale horizontal and vertical intensity value of each neighborhood is calculated. The mean grayscale horizontal intensity value is calculated individually for each neighborhood by summing up all pixel values for each neighborhood in the image generated in block 325 and dividing by the total number of pixels within the neighborhood. This is done for each neighborhood in the image. Accordingly, a mean grayscale horizontal intensity image statistic value is calculated for each neighborhood in the image.

Further, in block 350, the mean grayscale vertical intensity value is calculated individually for each neighborhood by summing up all the pixel values for each neighborhood in the image generated in block 315 and dividing by the total number of pixels within the neighborhood. This is done for each neighborhood in the image. Accordingly, a mean grayscale vertical intensity image statistic value is calculated for each neighborhood in the image.

In block 355 and 365, the variance of each neighborhood, Var(R), in the vertical binary texture image produced in block 320 and the horizontal binary texture image produced in block 330 are computed by:

$$\mathrm{Var}(R) = (\Sigma X - \overline{X})/(n-1)$$

where X is the binary value of the current pixel, $\overline{X}$ is the mean value of the pixels within the square neighborhood, and n is the area of the neighborhood, given by the total number of pixels within the neighborhood. Since the variance of a binary neighborhood is being computed, this reduces to a polynomial in one dimension $$\mathrm{Var}(R) = (w - (w^2/n))/(n-1)$$

where w is the number of pixels in the neighborhood above the binary threshold. Accordingly, a vertical binary variance image statistic value and horizontal binary variance image statistic value is calculated for each neighborhood in the image.

Further, in blocks 355 and 365, the mean vertical binary edge response area and the mean horizontal binary edge response area is calculated for each neighborhood in the vertical binary texture image produced in block 320 and the horizontal binary texture image produced in block 330. These image statistics values are computed by:

$$M_{ij} = \sum_x \sum_y x^i y^j I(x, y)$$

where the calculated moment $M_{ij}$ is given by the summation over the x and y dimensions of the pixel neighborhood, and i and j correspond to the index of the calculated moment. The binary area is given by $M_{00}$. Accordingly, a mean vertical binary edge response area statistic value and horizontal binary edge response area statistic value is calculated for each neighborhood in the image.

In block 360, the horizontal and vertical centroid location image statistic values for each neighborhood within the neighborhood, $\overline{x}$ and $\overline{y}$, respectively, of the directionally ambiguous texture image generated in block 335 is calculated by:

$$\overline{x} = M_{10}/M_{00}$$

and $$\overline{y} = M_{01}/M_{00}.$$

Accordingly, a horizontal and vertical centroid location statistic value is calculated for each neighborhood in the image.

Next, in blocks 370 and 375, the image statistics values for each neighborhood generated in blocks 345-365 are compared to predetermined neighborhood statistic values for grass. During this process, the value of each statistic in each individual neighborhood is compared to corresponding predetermined neighborhood statistics for grass. For each statistic, a binary (grass/not grass) representation of neighborhoods having mowable terrain is created. Accordingly, for each statistic, a neighborhood having a statistic value within a predetermined number of standard deviations of the corresponding predetermined image statistic value for grass is marked as grass (or assigned a "1") and neighborhoods that fall out of this range are marked as obstacle containing (or assigned a "0"). In some embodiments, the predetermined number of standard deviations is 3, and in other embodiments, the predetermined number of standard deviations is 2, but it is contemplated that a person having ordinary skill in the art can choose another predetermined number of standard deviations. Accordingly, this creates a binary (grass/not grass) representation of driveable terrain of the neighborhoods.

Figure 4:
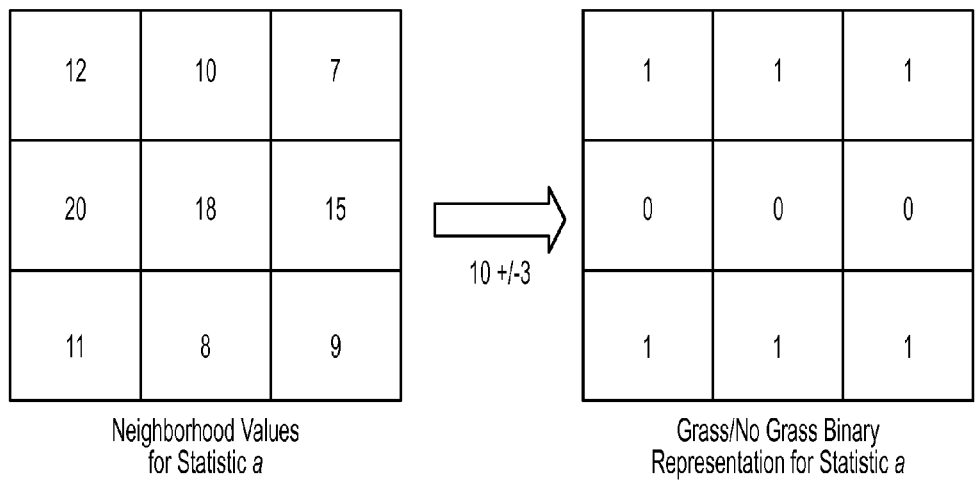
FIG. 4 illustrates the creation of a binary representation of an image statistic by comparing neighborhood values of the image statistic to a predetermined image statistic for grass in accordance with an embodiment of the present invention.

This process is demonstrated in FIG. 4, in which neighborhood values for statistic "a" are displayed for an image segmented into nine neighborhoods. The predetermined neighborhood statistic value for statistic "a" is 10, the standard deviation for "a" is 1, and the number of standard deviations being used is 3. Accordingly, a binary image is produced for statistic "a" in which all of the neighborhoods having values between 7 and 13 are assigned a "1" and all of the neighborhoods having values falling outside of the 7-13 range are assigned a "0". For the purposes of this example, statistic "a" can be any statistic, such as mean grayscale vertical intensity value, vertical binary variance, or mean vertical binary edge response area.

The predetermined neighborhood statistic values used in one embodiment of the invention can be found in Table 1. However, it is contemplated a person having ordinary skill in the art can choose to use other statistical values.

The predetermined neighborhood statistic value for hue is not listed in the table, but in one embodiment of the invention that uses a 31×31 pixel neighborhood, the mean hue value is $\bar{h}=180.04$, with a standard deviation of $\sigma(\bar{h})=30.08$.

The predetermined neighborhood statistic values were calculated from randomly selected neighborhoods that were randomly selected from images in two data sets taken between 9:00 AM and 11:59 AM on Aug. 31, 2009. All the neighborhoods contained only one type of surface. For example: neighborhoods containing illuminated grass contained only illuminated grass, shaded grass contained only shaded grass, and plastic fence neighborhoods contained only plastic fencing. Images from both sets were recorded on a plot of land which contained a mixture of rye, blue, and creeping red fescue grasses. These data sets were chosen for analysis for several reasons.

First, this grass mixture is the most common type of lawn grass found in the Midwest, and therefore results represent an accurate performance indicator of hue- and texture-based grass identification in a real-world environment. Second, data collection times are representative of typical times people tend to mow their lawns. Both data sets maintained constant lighting conditions, where the sun was visible at all times and never obscured by cloud cover when images were recorded.

By randomly selecting neighborhoods from both data sets, calculated statistics are valid for multiple times of day and are therefore not tuned to function only under specific, time dependent conditions.

Grass identification via some of these statistics was tested on 40 randomly selected samples of 31×31 neighborhoods containing: illuminated grass, shaded grass, artificial obstacles, and flowers. These results are tabulated in Table 2, which lists the number of correctly identified texture regions. Hue correctly identified 21/40 samples (52% accuracy) of shaded grass, 32/40 (80%) of artificial obstacles, and 16/40 (40% of flowers correctly. Illuminated grass was correctly identified with at least (38/40) 95% accuracy for all texture measurements except mean vertical grayscale intensity. Shaded grass was identified with at least 90% accuracy for all texture measurements except the mean vertical grayscale intensity. Binary horizontal variance and binary horizontal and vertical area identified obstacles correctly with at least 87.5% accuracy.

TABLE 1

NEIGHBORHOOD STATISTICS FOR NEIGHBORHOOD SIZE OF 31

| Measurement | Illuminated Grass | Shaded Grass | Flowerbed Edging | Flowers | Jeans | Soccer Ball |
|---|---|---|---|---|---|---|
| $\bar{I}$ (hTx,, vTx) | (−0.922, −10.169) | (−.027, −4.685) | (1.408, −5.644) | (−4.334, −13.333) | (0.251, −7.427) | (−4.739, −17.794) |
| $\sigma(\bar{I})$ (hTx, vTx) | (5.053, 3.288) | (1.637, 1.225) | (5.749, 6.764) | (17.224, 12.480) | (8.535, 4.655) | (15.448, 12.688) |
| $\overline{Var(R)}$ (hTx, vTx) | (0.231, 0.225) | (0.164, 0.144) | (0.088, 0.124) | (0.172, 0.191) | (0.090, 0.065) | (0.068, 0.098) |
| $\sigma(\overline{Var(R)})$ (hTx, vTx) | (0.010, 0.014) | (0.039, 0.045) | (0.075, 0.066) | (0.0519, 0.0419) | (0.053, 0.067) | (0.056, 0.062) |
| $\bar{A}$ (hTx, vTx) | (350.590, 332.810) | (203.90, 172.80) | (103.80, 150.70) | (221.30, 261.20) | (101.40, 76.10) | (74.90, 112.40) |
| $\sigma(\bar{A})$ (hTx, vTx) | (31.976, 39.559) | (59.056, 57.965) | (94.373, 92.161) | (76.288, 83.751) | (64.547, 87.778) | (65.829, 73.552) |
| $(\bar{x}, \bar{y})$ | (15.368, 15.015) | (15.415, 14.570) | (7.465, 13.008) | (16.691, 15.120) | (15.527, 13.126) | (18.407, 14.952) |
| $\sigma(\bar{x}, \bar{y})$ | (0.606, 0.599) | (0.951, 0.722) | (2.564, 1.067) | (2.469, 2.000) | (2.473, 6.364) | (6.152, 5.322) |

TABLE 2

NUMBER OF CORRECTLY IDENTIFIED TEXTURE REGIONS

| Measurement | Hue | $\overline{Var(R)}_{hTx}$ | $\overline{Var(R)}_{vTx}$ | $\bar{A}_{hTx}$ | $\bar{A}_{vTx}$ | $(\bar{x}, \bar{y})$ | $\bar{I}_{hTx}$ | $\bar{I}_{vTx}$ |
|---|---|---|---|---|---|---|---|---|
| Illuminated Grass | 40 | 40 | 40 | 38 | 38 | 40 | 38 | 14 |
| Shaded Grass | 21 | 36 | 36 | 36 | 36 | 39 | 40 | 8 |
| Artificial Obstacles | 32 | 37 | 31 | 35 | 35 | 28 | 10 | 33 |
| Flowers | 16 | 11 | 5 | 9 | 9 | 21 | 14 | 27 |

As is demonstrated in Table 2 above, some image statistics exhibit better performance than others for recognizing grass. Accordingly, a weighting coefficient is applied to the neighborhoods of image statistics produced in block 375 prior to the weighted statistics being added together in block 385.

In one embodiment of the invention, the performance of each neighborhood statistic is estimated by its ability to correctly classify 40 sample neighborhoods each of illuminated grass, shaded grass, and obstacles. These estimates were then used to generate a weighting coefficient for individual neighborhood statistic:

$$\alpha = \frac{(C_{illum} + C_{shaded} + C_{obs})}{120}$$

where α is the normalized weighting coefficient and $C_{illum}$, $C_{shaded}$, and $C_{obs}$ are the number of correctly identified neighborhoods of illuminated grass, shaded grass, and obstacles respectively. Each weighting coefficient is normalized by dividing the coefficient by the total number of image measurements (40×3=120 in this embodiment) to generate a normalized weighting coefficient between [0,1].

Table 3 contains pre-weight coefficients for each image statistic based on Table 2, and Table 4 contains the normalized pre-weight coefficients for six statistics:

TABLE 3

Pre-weight coefficients for each statistic.

| Weight Coeff. | Hue | $\overline{Var(R)}_{hTx}$ | $\overline{Var(R)}_{vTx}$ | $\overline{A}_{hTx}$ | $\overline{A}_{vTx}$ | $(\overline{x}, \overline{y})$ | $\overline{I}_{hTx}$ | $\overline{I}_{vTx}$ |
|---|---|---|---|---|---|---|---|---|
| a | 0.7750 | 0.9416 | 0.8916 | 0.9083 | 0.9083 | 0.8916 | 0.7333 | 0.45833 |

TABLE 4

Normalized pre-weight coefficients for six identifiers.

| Normalized Coeff. | Hue | $\overline{Var(R)}_{hTx}$ | $\overline{Var(R)}_{vTx}$ | $\overline{A}_{hTx}$ | $\overline{A}_{vTx}$ | $(\overline{x}, \overline{y})$ |
|---|---|---|---|---|---|---|
| aNorm | 0.1458 | 0.1771 | 0.1677 | 0.1708 | 0.1708 | 0.1677 |

In one embodiment, the resulting neighborhood statistics binary images created in block 375 are multiplied by their normalized coefficients and added together. More specifically, the resulting binary images for the neighborhood statistics are multiplied by their normalized coefficients. Then, corresponding neighborhoods are added with their applied weights to generate a grayscale representation of mowable terrain in the image, known as a probability map. The likelihood of a neighborhood containing grass is determined by the sum of the weighted statistics for the neighborhood.

In this embodiment, if a binary neighborhood is identified as grass containing for a neighborhood statistic, and the statistic's normalized weighting coefficient is 0.1, the likelihood of that neighborhood containing grass based on the neighborhood statistic increases by 0.1. This is repeated for all statistics for that neighborhood, such that the normalized weighting coefficients for the corresponding neighborhood statistics indicating "grass" are added together and multiplied by 1 and the corresponding normalized weighting coefficients for the corresponding neighborhood statistics indicating "not grass" are added together and multiplied by 0. The weighted "grass" and "not grass" results are added together and indicate the likelihood that the neighborhood contains grass.

Figure 5A:
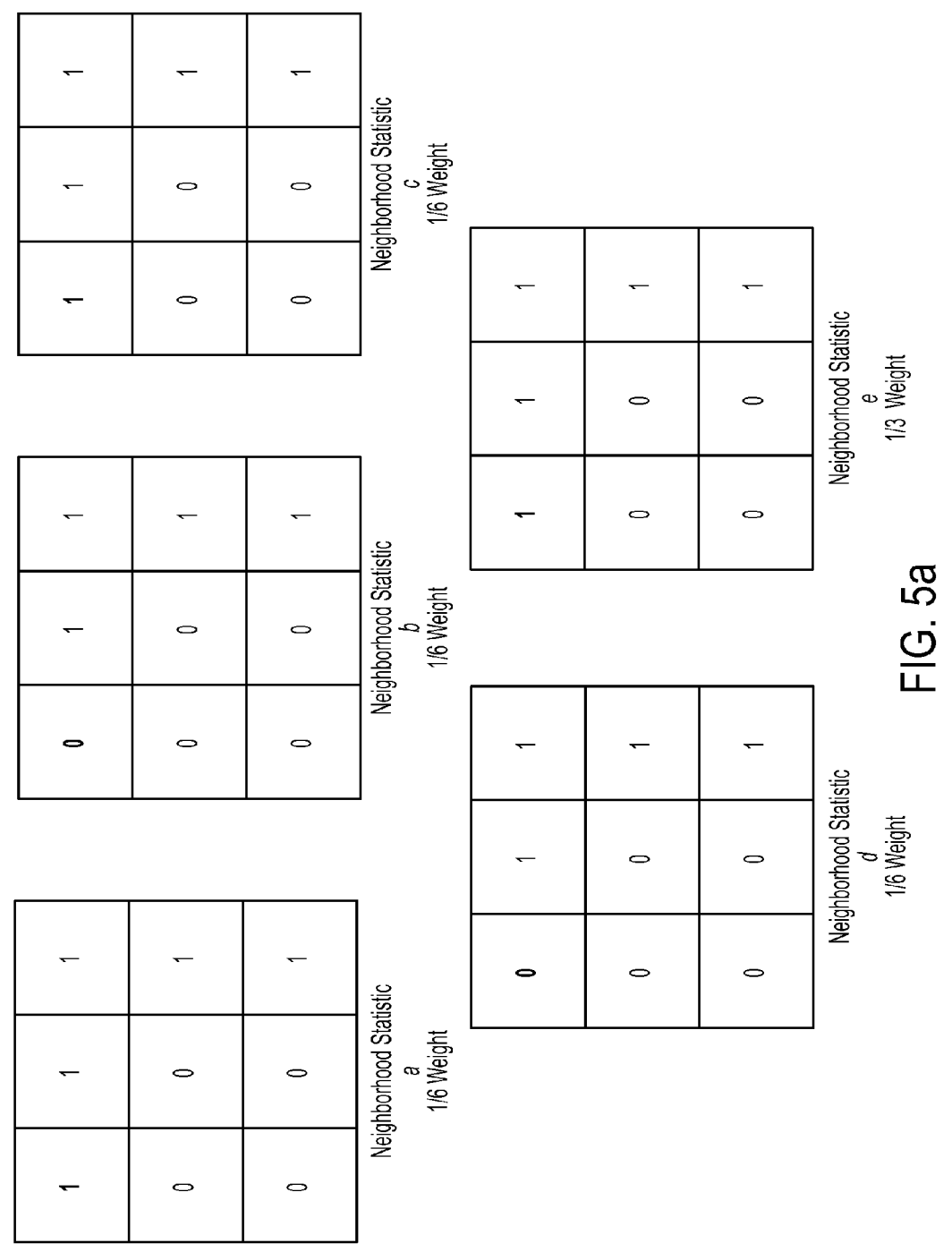

This concept can be illustrated by looking at FIGS. 5a-b in which five neighborhood statistics are used to identify grass in an image that is segmented into nine neighborhoods. Four of the neighborhood statistics are equally weighted and one has a weight twice that of the others. The neighborhood of interest is located at the upper left hand corner of the image and designated by the bold number.

For simplicity purposes, the statistics are identified as a through e. Looking at FIG. 5a, statistics a through d have been assigned a weight of ⅙, and e has been assigned a weight of ⅓. Now, assume that statistics a, c, and e identify the neighborhood as grass, indicated by a binary value of 1. Neighborhood statistics b and d state that the neighborhood of interest is not grass, indicated by a 0.

FIG. 5b illustrates the neighborhood statistics in the segmented binary texture images after the neighborhood statistics are multiplied by their normalized coefficients. Once the statistics for the neighborhood of interest are added up, the likelihood L, or probability, of that neighborhood being grass is:

$$L = 1 * \left(\frac{1}{6} + \frac{1}{6} + \frac{1}{3}\right) + 0 * \left(\frac{1}{6} + \frac{1}{6}\right) = \frac{2}{3}$$

In another embodiment, also illustrated by FIG. 5a, the likelihood L of the neighborhood of interest containing grass is calculated by adding up the normalized coefficients of the neighborhood statistics which identify the neighborhood of interest as grass:

$$L = \left(\frac{1}{6} + \frac{1}{6} + \frac{1}{3}\right) = \frac{2}{3}$$

In block 390, using the neighborhood probability information produced in block 385, a binary grass image map is created by assigning a "0" to all of the pixels in corresponding neighborhood locations having a probability of containing grass below an empirical threshold as not containing grass (assigned a "0"), and assigning a "1" to all of the pixels in corresponding neighborhood locations having a probability of containing grass above the threshold. Pixel groupings with an area of 1 in the binary image are removed. Accordingly, areas assigned a "1" represent grass containing areas, and areas assigned a "0" represent obstacle containing areas where no grass is present.

In one embodiment, a scale of [0,1] and an empirically determined probability threshold of 0.50 were used. In another embodiment, a scale of [0,1] and an empirically determined probability threshold of 0.75 were used. However, it is contemplated that a person having ordinary skill in the art can choose to use a different threshold value and/or scale.

Grass identification using combined statistics was tested on 40 randomly selected samples of 31×31 neighborhoods containing the same objects that were used for individual texture measurements. The combined statistical measurements relied on the six neighborhood statistics that are contained in Table 4 below. The weighting coefficients were normalized for the six neighborhood statistics.

TABLE 4

Normalized pre-weight coefficients for six identitifiers.

| Normalized Coeff. | Hue | $\overline{Var(R)}_{hTx}$ | $\overline{Var(R)}_{vTx}$ | $\overline{A}_{hTx}$ | $\overline{A}_{vTx}$ | $(\overline{x}, \overline{y})$ |
|---|---|---|---|---|---|---|
| aNorm | 0.1458 | 0.1771 | 0.1677 | 0.1708 | 0.1708 | 0.1677 |

In this test, correct neighborhood identification was deemed to occur if the neighborhood was correctly identified as grass or obstacle containing with a voting agreement greater than 0.5 (or 50%). Since each of the utilized neighborhood statistics had approximately the same individual accuracy, this corresponds to the majority of the neighborhoods identifying the neighborhood as either grass containing or obstacle containing. Neighborhood identification rates were also calculated for a voting agreement greater than 0.75 (or 75%). The number of correctly identified neighborhoods based on this criterion of the combined statistics for the neighborhoods are tabulated below is Table 5.

TABLE 5

Number of correctly identified 31 × 31 neighborhoods for combined measurement (n = 40 for each measurement).

| Measurement | Combined (50% Voting Threshold) | Combined (75% Voting Threshold) |
| --- | --- | --- |
| Grass | 40 | 40 |
| Shadow | 38 | 33 |
| Artificial Obstacles | 32 | 38 |
| Flowers | 6 | 15 |

For 0.5 (50%) voting agreement or greater, the ability to correctly identify shaded grass increases compared to nearly all statistics to 38/40 (95%) when combining multiple neighborhood statistics. Illuminated grass is still recognized with 40/40 (100%) accuracy. Artificial obstacle recognition performance also increases compared to stand-alone hue and binary vertical variance measurements. For 0.75 (75%) voting agreement or greater, artificial obstacle recognition performance improves significantly to 38/40 (95%) and illuminated grass is still recognized with 40/40 (100%) accuracy. In one embodiment, MATLAB, produced by The MathWorks, Inc., was used to carry out the processes in blocks 300-390. However, it is contemplated that a person having ordinary skill in the art can use other software or hardware to carry out the operations.

In block 395, the binary grass image map generated in block 390 is abstracted to a range image. In one embodiment, the range image conversion occurs in the following way. First, the binary grass map, which is an array, is converted from rectangular real-world coordinates to a polar representation using the "Rectangular-to-Polar Array" function in LabVIEW, produced by National Instruments. This creates a binary range image of the mowable terrain and obstacle locations in the current camera frame, where the (0,0) location of the camera is located in the middle element of the bottom row of the array. Corresponding (r,θ) pairs are then sorted using LabVIEW's "Sort 1D Array" method, and the shortest range for each integer value of theta in the camera's field of view is inserted into a 1-D Array shifted so that the ranges are relative to the (0,0) location of the robot body. Ranges are inserted into the array sequentially, which creates a data structure identical to what is output by the LIDAR, where the first element corresponds to the range to the nearest obstacle at θ=1°, the second element corresponds to the range to the nearest obstacle at θ=2° degrees, etc. If an obstacle is not observed at a θ value, a range of 4 meters is entered into the corresponding 1-D array element, a distance equivalent to the maximum range of the SICK LMS291, indicating that no obstacle is present at that angle. This 1-D range array is referred to as a "pseudo-LIDAR" scan.

Optionally, to visualize the pseudo-LIDAR scan, a polar function is fit to the 1-D array and plotted in LabVIEW's front-panel. This allows the user to monitor what obstacles the mower was or was not able to see.

This range image processing occurs at a minimum of 10 Hz during mower operation. The resulting 1-D array is passed to the freespace observer. The freespace observer accomplishes two things. First, it combines the new pseudo-LIDAR observations with previously observed freespace to create an accurate estimate of traversable terrain around the robot. Second, it shifts observed ranges in front of the mower to behind the mower in accordance with how the mower moves through the environment. This shifted freespace is simply the previous freespace estimation, shifted according to the change in position and orientation of the mower's center. This creates a 360° representation of the currently traversable space around the mower, which is passed to the navigation system.

In one embodiment, the navigation systems is an onboard National Instruments compactRIO programmable automation controller; however, it is contemplated that a person having ordinary skill in the art can choose to use another navigation system.

Figure 6:
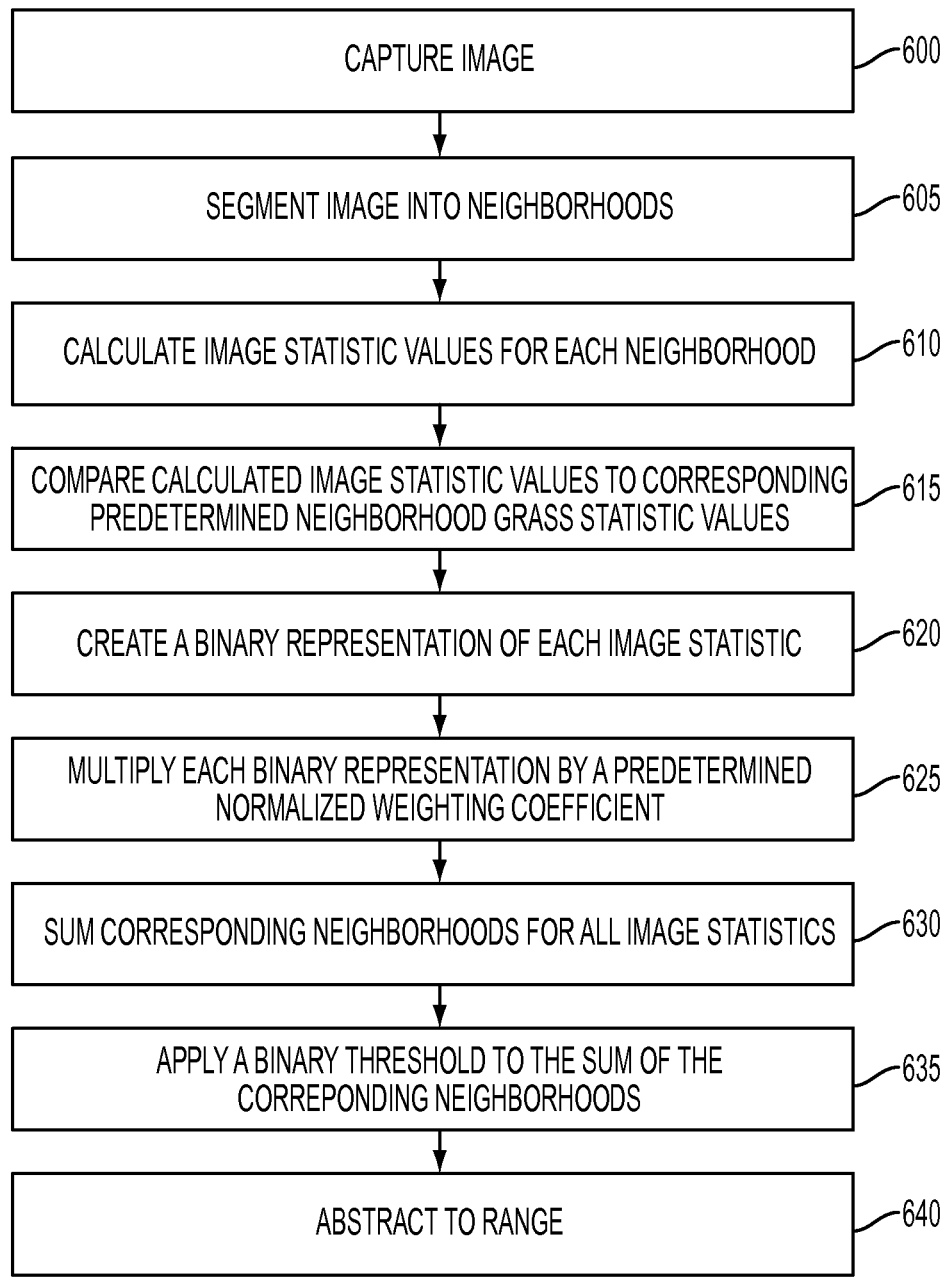
FIG. 6 contains a flow chart in accordance with an embodiment of the present invention.

Turning now to another embodiment of the invention as shown in FIG. 6, in block 600, an image is captured of the terrain in front of the lawnmower. In block 605, the image is segmented into neighborhoods. In block 610, image statistic values are calculated for each neighborhood. In one embodiment, at least two image statistics are calculated for each neighborhood. In block 615, the image statistic values calculated in block 610 are compared to predetermined neighborhood grass statistics. In block 620, a binary representation of each image statistic is generated, wherein each neighborhood statistic value that compares favorably in block 615 is marked as grass (assigned a "1"), and each neighborhood statistic value that compares unfavorably in block 615 is marked as not containing grass (assigned a "0"). This is illustrated in FIG. 4.

In block 625, each binary representation is weighted using predetermined normalized weighting coefficients. In block 630, the corresponding neighborhoods for all of the image statistics are summed. In block 635, a binary threshold is applied to the image statistics summed in block 630, thereby creating a grass/no grass binary neighborhood map. In block 640, the binary map generated in block 635 is abstracted into a range image.

Figure 7:
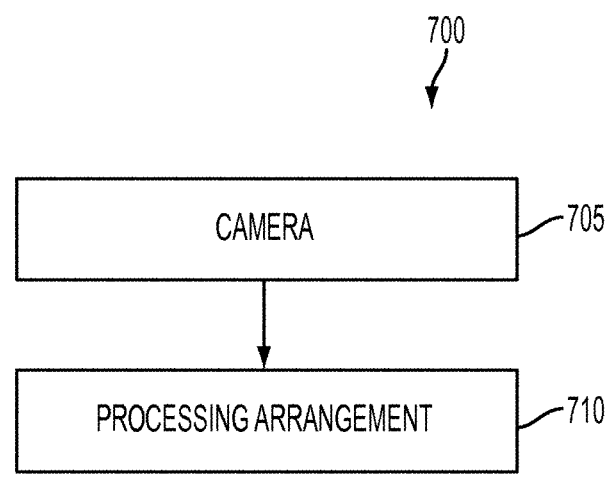
FIG. 7 contains a block diagram of a vision system in accordance with an embodiment of the present invention.

Turning to FIG. 7, which discloses a vision processing system 700 for an autonomous lawnmower having a mounted camera 705 and a processing arrangement 710. The processing arrangement 710, such the Mac Mini discussed above, connected to camera 705 join together as a vision system for the lawnmower. The processing arrangement provides structure for segmenting each image captured by cameras 705 into neighborhoods. The processing arrangement further provides structure for calculating at least two image statistics for each neighborhood. Additionally, the processing arrangement provides structure for generating a binary representation of each image statistic, wherein a neighborhood for an image statistic is marked as grass containing when the neighborhood image statistic compares favorably to a predetermined image statistics for grass. The processing arrangement further provides structure of applying a weight to each of the binary representations of each image statistic. The processing arrangement further providing structure of summing corresponding neighborhoods for all image statistics. Further, the processing arrangement further providing structure for applying a binary threshold to each of said summed neighborhoods, wherein a binary map is produced representing grass containing areas and non-grass containing areas. Further, the binary map representing grass containing areas and non-grass containing areas can be abstracted to a range image.

While this invention has been described in conjunction with the specific embodiments described above, it is evident that many alternatives, combinations, modifications and variations are apparent to those skilled in the art. Accordingly, the preferred embodiments of this invention, as set forth above, are intended to be illustrative only, and not in a limiting sense. Various changes can be made without departing from the spirit and scope of this invention. Therefore, the technical scope of the present invention encompasses not only those embodiments described above, but also all that fall within the scope of the appended claims.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal language of the claims.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

What is claimed is:

1. A method for identifying lawn grass comprising:
capturing an image of terrain in front of a mower;
segmenting said image into square neighborhoods;
calculating values for at least two image statistics for each of said neighborhoods;
comparing said image statistic values of said neighborhoods to predetermined image statistic values for grass;
generating a binary representation of each image statistic for each neighborhood, wherein said neighborhood for said image statistic is marked as grass-containing when said image statistic value of said neighborhood compares favorably to a predetermined image statistic value for grass, and said neighborhood for said image statistic is marked as not containing grass when said image statistic value of said neighborhood does not compare favorably to said predetermined image statistic value for grass;
weighting each of said binary representations of each image statistic by multiplying said binary representations of said image statistics by predetermined normalized weighting coefficients;
summing corresponding neighborhoods for all of said weighted binary representations of said image statistics; and
applying a binary threshold to each of said summed neighborhoods, wherein said binary threshold produces a binary map representing grass-containing areas and non-grass-containing areas;
wherein said image statistics include at least one of the following edge based texture statistics: mean grayscale horizontal intensity, mean grayscale vertical intensity, vertical binary variance, mean vertical binary edge response area, horizontal and vertical neighborhood centroid location, horizontal binary variance, or mean horizontal binary edge response area; said at least one edge based texture statistics are generated using a vertical texture image of said image and/or a horizontal texture image of said image.

2. The method of claim 1, wherein one of said image statistics is mean hue.

3. The method of claim 1, wherein said image statistic value of said neighborhood compares favorably to a predetermined image statistic for grass when said image statistic value of said neighborhood is within a predetermined number of standard deviations of said predetermined image statistic value for grass.

4. The method of claim 1, wherein at least one of said image statistics is calculated using an intensity plane extracted from said captured image.

5. The method of claim 1, wherein said binary map representing grass-containing areas and non-grass-containing areas is abstracted to a range image.

6. A vision processing system for an autonomous lawnmower comprising:
an image capturing camera mounted on said lawnmower for capturing an image of terrain in front of said lawnmower;
a processing arrangement connected to said camera for segmenting said image into square neighborhoods;
said processing arrangement further providing structure for calculating values for at least two image statistics for each neighborhood;
said processing arrangement further providing structure for generating a binary representation of each image statistic for each neighborhood, wherein said neighborhood for said image statistic is marked as grass-containing when said image statistic value of said neighborhood compares favorably to a predetermined image statistic value for grass, and said neighborhood for said image statistic is marked as not containing grass when said image statistic value of said neighborhood does not compare favorably to said predetermined image statistic value for grass;
said processing arrangement further providing structure for applying a weight to each of said binary representations of each image statistic by multiplying said binary representations of said image statistics by predetermined normalized weighting coefficients;
said processing arrangement further providing structure for summing corresponding neighborhoods for all of said weighted binary representations of said image statistics; and
said processing arrangement further providing structure for applying a binary threshold to each of said summed neighborhoods, wherein a binary map is produced representing grass containing areas and non-grass containing areas;
wherein said image statistics include at least one of the following edge based texture statistics: mean grayscale horizontal intensity, mean grayscale vertical intensity, vertical binary variance, mean vertical binary edge response area, horizontal and vertical neighborhood centroid location, horizontal binary variance, or mean horizontal binary edge response area; said at least one edge based texture statistics are generated using a vertical texture image of said image and/or a horizontal texture image of said image.

7. The vision processing system of claim 6, wherein said image statistic of said neighborhood compares favorably to a predetermined image statistic for grass when said image statistic of said neighborhood is within a predetermined number of standard deviations of the predetermined image statistic for grass.

8. The vision processing system of claim 6, wherein one of said image statistics is mean hue.

9. The vision processing system of claim 6, wherein at least one of said image statistics is calculated using an intensity plane extracted from said captured image.

10. The vision processing system of claim 6, wherein said binary map representing grass-containing areas and non-grass-containing areas is abstracted to a range image.

\* \* \* \* \*